G. H. SHULER.
WIPER FOR AUTOMOBILE SHIELDS.
APPLICATION FILED SEPT. 21, 1917.
1,264,692. Patented Apr. 30, 1918.
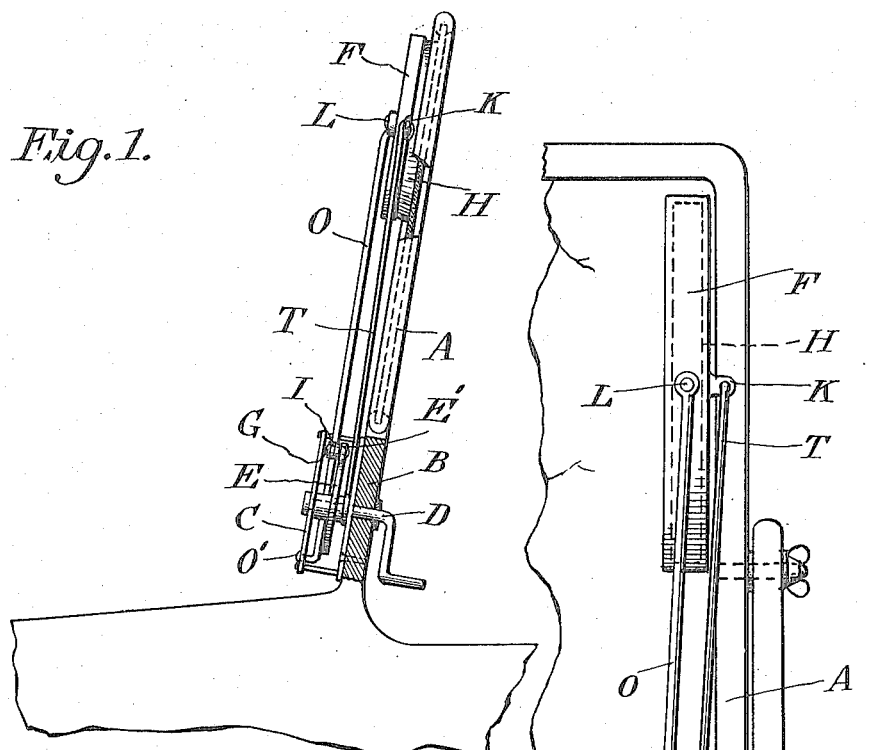
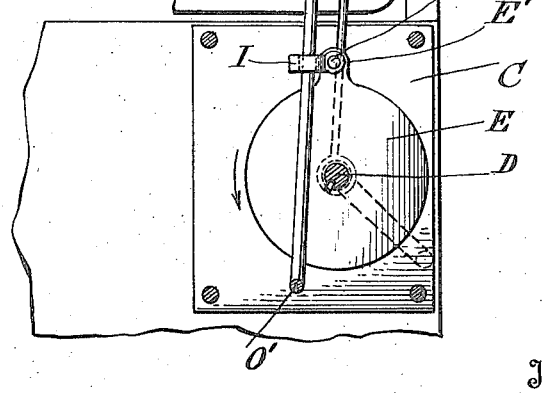

UNITED STATES PATENT OFFICE.

GUSTAVUS H. SHULER, OF MUNGER, MICHIGAN.

WIPER FOR AUTOMOBILE-SHIELDS.

1,264,692.   Specification of Letters Patent.   Patented Apr. 30, 1918.

Application filed September 21, 1917.   Serial No. 192,509.

*To all whom it may concern:*

Be it known that GUSTAVUS H. SHULER, a citizen of the United States, residing at Munger, in the county of Bay and State of Michigan, has invented certain new and useful Improvements in Wipers for Automobile-Shields; and he does hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for wiping wind shields of automobiles and consists of a simple and efficient device of this nature having various details of construction, combinations and arrangements of parts which will be hereinafter fully described, shown in the accompanying drawings and then specifically defined in the appended claims.

My invention is illustrated in the accompanying drawings which, with the letters of reference marked thereon, form a part of this specification, and in which:

Figure 1 is a side elevation showing the application of my invention to the support of a wind shield, and Fig. 2 is an enlarged detail in elevation with the front of the casing removed.

Reference now being had to the details of the drawings by letters:

A designates the frame of a wind shield having supporting members B, and a casing C containing the operative parts of the device is clamped or otherwise fastened to the support of the wind shield and has journaled therein a rock shaft D having a disk E fixed thereto. F is a wiper frame carrying a wiper H, said frame having a laterally extending lug K. A pin L projects from said frame and to which the upper end of the rod O is pivoted, the lower end being angled, as at O', and pivotally mounted in an aperture in the wall of the casing. A lug E' projects from the disk and is apertured for the reception of a pivotal pin G, to which a bearing member I is pivoted, and through which said rod has a play. A wire, designated by letter T, has a hook and engages an aperture in said lug upon the wiper and its other end has an eye through which the shaft D passes, the said wire serving as a means for holding the wiper in a horizontal position as it moves laterally back and forth over the wind shield.

By the provision of a device embodying the features of my invention, it will be noted that the casing may be removably attached to the support of the wind shield and by simply turning a crank the shield may be kept clear of foreign matter, such as dust, water, sleet, etc. In operation, when the shaft is rocked the rod O will swing back and forth causing the wiper F to move horizontally against the wind shield, the wire T serving to hold said wiper in a vertical position as it moves back and forth, thus affording a simple and efficient device whereby the wind shield may be cleared of foreign matter, dust, water, sleet, etc., and a mechanism which may be easily and quickly attached to the wind shield of any automobile.

What I claim to be new is:

1. A wiper for wind shields of automobiles, comprising a casing adapted to be supported upon a frame of a wind shield, a rock shaft journaled in said casing, a wiper frame and wiper therein, a rod pivotally mounted at its lower end in said casing and its upper end pivoted to the wiper frame, a disk fixed to said shaft, and connections between the disk and said rod for swinging the same and causing the wiper to be moved back and forth against the wind shield.

2. A wiper for wind shields of automobiles, comprising a casing adapted to be supported upon a frame of a wind shield, a rock shaft journaled in said casing, a wiper frame and wiper therein, a rod pivotally mounted at its lower end in said casing and its upper end pivoted to the wiper frame, a disk fixed to said shaft, a bearing member pivotally mounted upon said disk and through which said rod has a play, a rod pivoted at its upper end to the wiper frame and its lower end fastened about said shaft, said shaft adapted to be given a rocking movement to cause the rod to swing back and forth.

In testimony whereof I hereunto affix my signature in presence of two witnesses.

GUSTAVUS H. SHULER.

Witnesses:
 FRANK ROBBINS,
 GEORGE DOYLE.